S. M. FREEBORN.
DIRIGIBLE AUTOMOBILE LAMP.
APPLICATION FILED AUG. 12, 1913.
1,097,087.
Patented May 19, 1914.
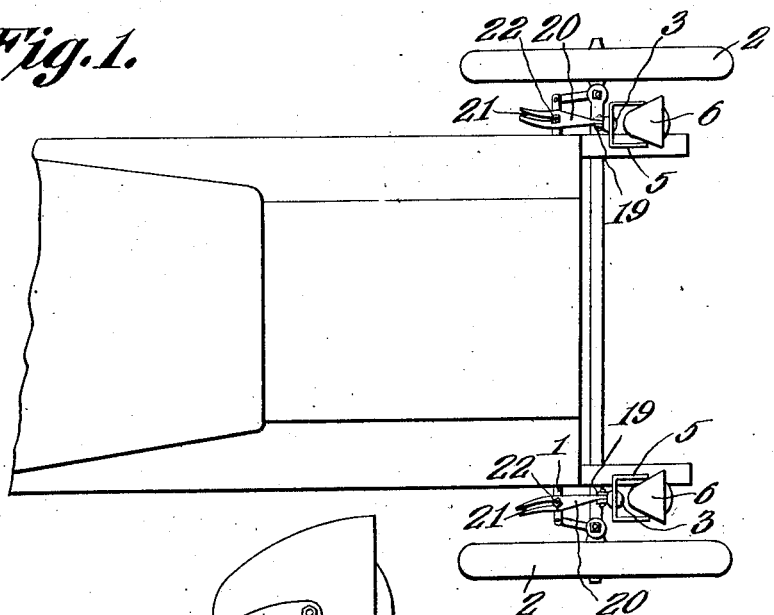
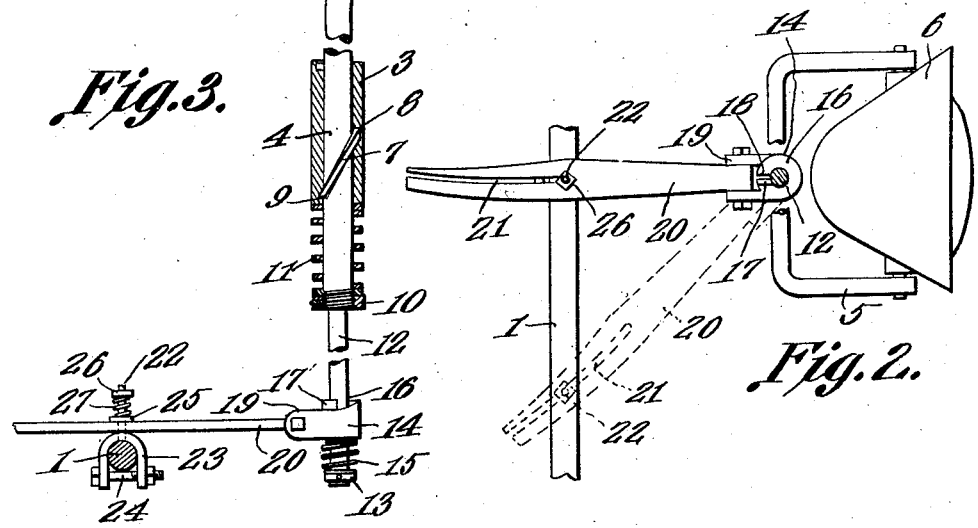
Sidney M. Freeborn,
Inventor
by C. A. Snow & Co.
Attorneys

UNITED STATES PATENT OFFICE.

SIDNEY MILLS FREEBORN, OF SAN ANTONIO, TEXAS.

DIRIGIBLE AUTOMOBILE-LAMP.

1,097,087.

Specification of Letters Patent. Patented May 19, 1914.

Application filed August 12, 1913. Serial No. 784,391.

*To all whom it may concern:*

Be it known that I, SIDNEY M. FREEBORN, a citizen of the United States, residing at San Antonio, in the county of Bexar and State of Texas, have invented a new and useful Dirigible Automobile-Lamp, of which the following is a specification.

The present invention appertains to automobile or motor car lamps or headlights, and aims primarily to provide novel and improved dirigible lamp for an automobile or other vehicle.

It is the object of the present invention to provide unique means for automatically turning the respective lamp toward that side to which the vehicle is steered or turned.

Another object of the present invention is to provide such peculiar means for automatically operating the lamps, that the respective right and left hand lamps will be turned to the right and left, when the vehicle is steered either to the right or left, while that lamp away from the side to which the vehicle is turned will remain stationary.

A further object of the present invention is to provide means for automatically turning or swinging the lamps, as specified, and so operable under ordinary conditions, as to permit the steering wheels to wabble or vibrate slightly due to the unevenness of the road bed or surface traversed, without correspondingly vibrating or shaking the lamps.

The present invention also comprehends the provision of an apparatus for carrying the head lights or lamps, and of such simple and novel construction, as to be readily applicable to various automobile bodies, or to the steering gears thereof, and in order that the lamps may be operated automatically in an efficient and simple manner.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a plan view of the front end of an automobile, illustrating the present apparatus applied to the steering gear. Fig. 2 is a plan view of one of the lamp operating mechanisms, parts being broken away. Fig. 3 is a side elevation of the mechanism depicted in Fig. 2, parts being shown in section, and parts being broken away.

The automobile or motor car illustrated in Fig. 1 is to be taken as an arbitrary or conventional structure, it being understood at the outset, that the present device is applicable to various motor propelled vehicles, including a steering rod 1 connecting the front steering wheels 2.

The present apparatus embodies right and left hand mechanisms for carrying the respective lamps or headlights, and the left hand mechanism illustrated in Figs. 2 and 3, need only be described in detail to give a clear understanding of the two mechanisms.

Referring specifically to the left hand mechanism, the same embodies an upright sleeve or bearing 3, which is secured in any convenient manner to the chassis or bed of the automobile adjoining the left hand steering wheel. An upright rock shaft or spindle 4 is journaled through the sleeve 3, and carries a suitable lamp bracket 5 at its upper end, to which is attached any suitable lamp or headlight 6. The shaft 4 is provided with a spiral or helical thread 7 engaging a corresponding groove 8 in the inner wall of the sleeve 3. The thread 7 has a relatively large pitch, or is a "quick" thread and extends through approximately a single convolution only. The lower end of the groove 8 is closed, to provide a stop 9 against which the lower end of the thread 7 is seatable when the shaft 4 is depressed, in order to hold the lamp 6 in its proper forward position. This shaft or spindle 4 is normally depressed by means of a collar 10 threaded on the shaft 4 at a point below the sleeve 3, and a coiled spring 11 compressibly disposed between the collar 10 and the lower end of the sleeve 3, whereby the tension of the spring 11 will yieldingly force the shaft 4 downwardly, to normal or initial position. The shaft or spindle 4 is preferably reduced in diameter from the collar 10 to its lower end or extremity, as at 12, and upon the lower end or extremity of the shaft 4 or its reduced portion 12, is secured a collar 13.

In order to oscillate or actuate the shaft 4 by means of the steering rod 1, an annulus or ring 14 is mounted loosely on the reduced portion 12 of the shaft 4 slightly above the collar 13, and a coiled wire compression spring 15 surrounds the reduced portion 12 of the shaft between the collar 13 and the ring 14. The upper face of the ring 14 is in the form of a helix or spiral as at 16, and seats against a radial lug or finger 17 formed on or secured to the reduced portions 12 of the shaft at a point spaced slightly above the collar 13 or the lower end of the shaft. The helical or spiral face 16 of the ring 14 forms a shoulder 18 co-operating with the lug or finger 17, the shoulder 18 being normally spaced slightly from the lug 17 when the steering rod 1 is in its neutral position, as will hereinafter appear. The ring or collar 16 is provided with a pair of rearwardly projecting ears 19, between which is fulcrumed the forward end of a rearwardly projecting arm 20. The arm or lever 20 passes over the end portions of the steering rod 1, and the rear or free portion of the arm 20 is provided with a longitudinal open slot 21, which is curved slightly, for the purposes which will hereinafter appear. The arm or lever 20 is operatively connected with the steering rod 1, as will be presently described.

An upstanding stem or finger 22 is carried by the respective end portion of the steering rod 1, the same upstanding from the back or bend of a U-shaped clip 23 straddling the steering rod 1. The terminals of the clip 23 are connected by a bolt or clamping member 24 to secure the clip or clamp 23 rigidly to the steering rod with the stem or finger 22 in an upstanding or vertical position. The stem 22 passes through the slot 21 of the respective arm or lever 20, in order that when the steering rod is reciprocated laterally to swing or turn the steering wheels, the arm or lever 20 will be oscillated accordingly. A washer 25 is mounted upon the stem 22 and engages the arm or lever 20, while a nut or stop 26 is threaded or engaged over the free or upper end of the stem 22, a coiled wire compression spring 27 embracing the stem 22 between the washer 25 and the nut or stop 26, to yieldingly hold the arm 20 against the back or crest of the clip 23. The axis of the stem or pin 22 is vertical, in order to permit the arm 20 to swing horizontally with respect to the steering rod, while the arm 20 is so fulcrumed between the ears 19, as to permit the arm to swing vertically with respect to the lamp carrying shaft 4.

In the left hand lamp actuating mechanism, the thread 7 is right handed, while in the right hand mechanism, the thread 7 of the respective shaft is left handed, which is also true of the helical or spiral faces 16 of the rings or collars 14. It will thus be evident, at this point, that the two mechanisms will operate in opposite directions, for the purposes which will hereinafter appear. The slot 21 of the left hand arm or lever 20 is curved to the left, while the slot 21 of the right hand arm or lever is curved to the right. It might be well to state that the inner ends of the slots 21 lie in the longitudinal median lines of the respective arms or levers 20, and the outer or open ends of the slots are curved gently away from the said median lines, as above intimated.

It is of course understood that the present apparatus may be constructed in various sizes and proportions so as to accommodate the various prevailing automobiles, and that such changes or alterations may be made, as may be necessary to accommodate the apparatus to the various automobiles, without departing from the spirit of the invention, as defined in the appended claims. Thus, the particular application of the apparatus as illustrated and described, is to be taken as typical or suggestive.

In the operation of the devices as illustrated and described, when the steering rod 1 is moved to the left, to steer the vehicle to the right, it being noted that the steering rod is disposed in rear of the front axle, the arms or levers 20 will be swung to the left. The left hand arm or lever 20 being swung to the left, will swing the ring or collar 14 clockwise, as seen in Fig. 2, so as to move the shoulder 18 away from the lug or finger 17 of the corresponding lamp carrying shaft, in order that the left hand lamp may remain stationary so as to shine straight forward. The right hand arm or lever 20 being swung to the left, will cause the corresponding ring or collar 14 to be swung clockwise, so as to swing the shoulder 18 against the lug or finger 17, thus swinging or oscillating the right hand shaft or spindle 4, to turn or swing the right hand lamp or headlight 6 toward the side to which the machine is turned or steered. Conversely, when the steering rod is moved to the right, to steer the vehicle to the left, the left hand lamp or headlight will be turned or directed to the left, while the right hand lamp will remain stationary or in its forward position. In this manner, as the vehicle is steered, one lamp will always be directed directly ahead or forwardly, while the other lamp is turned to the side toward which the vehicle is steered, both lamps being directed forwardly when the vehicle is traveling in a straight line or directly forward. The advantages of such an arrangement are clearly obvious, and need not be discussed at length.

It is to be observed that when the respective shaft or spindle 4 is rotated, as above described, the thread 7 will travel upwardly within the groove 8 of the corresponding sleeve or bearing 3, so as to not only rotate or turn the bracket 5 and lamp 6 carried thereby, but to also move the shaft or spindle upwardly against the tension of the spring 11. This is desirable for the reason that when the steering rod is brought back to neutral or normal position, the spring 11 in recoiling will depress the shaft which has been swung out of normal position, in order to turn the shaft back to normal, the thread 7 sealing on the stop 9 to limit the movement of the shaft 4, as indicated. In this connection, it will be evident that the arms or levers 20 being pivoted or fulcrumed to the rings or collars 14 will permit the shafts to move or reciprocate vertically, without affecting the operation of the arms or levers, and furthermore, the arms or levers 20 being held yieldingly upon the stems 22, by the springs 27, will be permitted to swing sufficiently upon the clips or clamps 23, so that the proper operation may ensue as above described.

Another salient or cardinal feature of the present invention resides in the fact that the shoulders 18 are normally spaced slightly from the lugs or fingers 17, which will permit the steering rod to reciprocate or vibrate slightly, due to the wabble or play of the steering wheels under ordinary conditions, without correspondingly vibrating or shaking the lamps, as would be objectionable. When the arms or levers 20 are swung so as to move the shoulders 18 away from the fingers 17, the helical or spiral faces 16 will move under the respective lugs or fingers 17, so as to force the respective rings or collars 16 downwardly, against the tension of the springs 15. The lost motion provided by the play between the shoulders 18 and the lugs 17 is taken up by the curved slots 21 of the arms or levers 20, when the respective arms or levers are swung so as to swing the respective lamps. For instance, when the left hand lever 20 is swung to the right, by the steering rod, the stem or pin 20 moving outwardly along the respective slot 21, will cause the shaft 4 to be swung with an accelerated motion, that is, with an increasing velocity, in order that the lamp may swing approximately parallel with the steering wheels.

From the foregoing, taken in connection with the drawing, the advantages and capabilities of the present apparatus will be apparent to those versed in the art, without the necessity or further explanation, it being noted that the objects aimed at have been carried out satisfactorily, and that the present invention provides a desirable and efficient apparatus for the purposes pointed out.

Having thus described the invention, what is claimed as new is:—

1. In a device of the character described, a sleeve attachable to an automobile bed, a lamp carrying rock shaft threaded through the sleeve, an actuating lever pivoted to the rock shaft, and means attachable to the steering rod of the automobile, and with which the lever is slidably and pivotally engaged.

2. In a device of the character described, a sleeve attachable to the bed of an automobile, a spring pressed lamp carrying rock shaft threaded through the sleeve and limited in its movement by the sleeve, a member mounted loosely on the shaft, a lever carried by the said member, means adapted to be carried by the steering rod of the automobile and with which the lever is slidably engaged, and coöperating means carried by the said member and shaft for rocking the shaft against the tension of its spring when the lever is swung in one direction.

3. In a device of the character described, a sleeve attachable to the bed of an automobile, a lamp carrying rock shaft threaded through the sleeve and limited in its movement thereby, a spring disposed between the sleeve and shaft for yieldingly holding the shaft in normal position, a collar mounted loosely on the shaft, a lever carried by the collar, and means adapted to be carried by the steering rod of the automobile and with which the lever is slidably engaged, the collar and shaft having coöperating portions for rocking the shaft when the lever is swung in one direction.

4. In a device of the character described, a sleeve attachable to the bed of an automobile, a spring-pressed lamp carrying rock shaft threaded through the sleeve and limited in movement thereby, a collar loosely embracing the shaft, the collar and shaft having a coöperating shoulder and lug, respectively, a slotted lever pivoted to the collar, and a stem adapted to be carried by the steering rod of the automobile to engage the slot of the lever.

5. In a device of the character described, a sleeve attachable to the bed of an automobile, a spring pressed lamp carrying rock shaft threaded through the sleeve and limited in movement thereby, a collar loosely embracing the shaft, the collar and shaft having a coöperating shoulder and lug, respectively, a slotted lever pivoted to the collar, a clip attachable to the steering rod of the automobile, and having an upstanding stem to engage the slot of the lever, and a spring carried by the free portion of the stem to yieldingly hold the lever against the clip.

6. In a device of the character described, a sleeve attachable to the body of an automobile, a spring pressed lamp-carrying shaft threaded through the sleeve and limited in movement thereby, a collar loosely embracing the shaft and having a spiral face forming a shoulder, a shaft having a lug coöperating with the said shoulder and against which the said face of the collar rests, means carried by the shaft for yieldingly holding the collar against the said lug, a lever pivoted to the collar, and means adapted to be carried by the steering rod of the automobile and with which the lever is slidably engaged.

7. In a device of the character described, a sleeve attachable to the bed of an automobile, a spring pressed lamp-carrying shaft threaded through the sleeve, a collar loosely embracing the shaft, the collar and shaft having a coöperating normally spaced shoulder and lug, respectively, a slotted lever pivoted to the collar, and a stem adapted to be carried by the steering rod of the automobile to engage the slot of the lever, the said slot being curved.

In testimony that I claim the foregoing as my own, I have hereto affixed my signature in the presence of two witnesses.

SIDNEY MILLS FREEBORN.

Witnesses:
  N. S. KELLER,
  F. G. ANTONIO.